United States Patent Office 3,227,553

Patented Jan. 4, 1966

3,227,553

PHOTOSENSITIVE MATERIALS

Mikio Tamura Kyoto-shi, Yoshiaki Konishi, Hiroshima-ken, and Hiroshi Hada, Kyoto-shi, Japan, assignors to Fuji Photo Film Co., Ltd., Kanagawa-ken, Japan, a corporation of Japan No Drawing. Filed Mar. 5, 1963, Ser. No. 263,074
Claims priority, application Japan, May 8, 1962, 37/19,030
2 Claims. (Cl. 96—27)

This invention relates to photosensitive materials, more particularly, a layer of silver alginate.

The photosensitive materials of the present invention may be prepared by coating an aqueous solution of salts of alginic acid on a support to form a layer on it, and then impregnating the layer with an aqueous solution containing silver salts to convert said layer into a layer of silver alginate.

When the layer of silver alginate of the present invention is irradiated with ultra-violet ray in the presence of moisture, an image which has metallic lustre and high electric conductivity is produced due to the deposition of silver on the surface and in adjacent part to the surface of the layer in the areas irradiated by ultraviolet ray. Electric conductivity of the irradiated area is much greater than that of silver alginate itself and is nearly equal to that of thin layers of metallic silver.

The deposition rate is extremely decreased in case of irradiation in the absolute dry state, however, satisfactory results can be obtained in the presence of moisture of only a few percent of relative humidity.

Any material can be used as the support for the photosensitive materials of this invention as far as it has no detrimental effect against the formation of the layer of silver alginate. Representative examples of such supports include glass, cellulose triacetate, polyethylene terephthalate, polystyrene, polyvinylchloride, Bakelite, paper, wood, stainless steel, alumite and the like, and if desired, they may be subbed with suitable materials such as gelatin.

The water-soluble salts of alginic acid which may be used for the photosensitive materials of the present invention are, for example, sodium, potassium and ammonium alginates, and the water-soluble silver compounds which may be used are, for example, nitrate, chlorate, perchlorate, acetate and lactate of silver. Sodium alginate and silver nitrate are usually preferred.

Various kinds of methods may be used to form layers of silver alginate, depending upon the desired application of the photosensitive material of this invention. For example, the layer of silver alginate of the present invention is produced by coating 0.1% to 10% aqueous sodium alginate solution on a support to more than 1 $\mu$ of dry thickness, and then, with or without drying them, immersing the assembly obtained into 0.01 to 10% aqueous silver nitrate solution or coating them with the silver-nitrate solution in the absence of strong ultraviolet ray. The photosensitive materials thus obtained may be used without washing with water, but it is preferable to wash them with water to remove the remaining silver nitrate, thereby the end products will become more stable on storage. It is convenient in actual use to dry the layer of silver alginate, but it is not always necessary to do so.

Usually, the exposure to the light sources, e.g. sun-light or mercury lamp through a suitable original figure for a period of about thirty minutes to three hours is sufficient to obtain satisfactory results with the photosensitive materials of the present invention. After exposure, for example, immersion of the layer into an aqueous potassium iodide solution may decrease the photosensitivity of the unexposed portions, but the layer of silver alginate shows little change during handling in usual room-condition for a long time even without such treatment.

It is the very feature of the photosensitive materials of the present invention that images with metallic lustre and permanent electric conductivity are produced only in the areas irradiated with ultraviolet ray. Therefore, the novel photosensitive materials of the present invention are completely different from those of prior art, e.g., electric conductive paints which themselves have the electric conductivity or photo conductive materials which have electric conductivity in portions irradiated by light only during the irradiation. Furthermore, any prior photosensitive material containing silver salts could not produce an image with such metallic lustre and high electric conductivity as in this invention, when they are printed out with irradiation.

The electric conductivity of the irradiated part of the layer of silver alginate increases to about $10^6$ to $10^9$ times that of the non-irradiated part, therefore, the photosensitive materials of this invention may be used as electric conductive materials. For example, the layer of silver alginate of the present invention may be irradiated through an original figure to form microelectric circuits made of metallic silver. In case of using metals as supports, if the layer of silver alginate is sufficiently thick, the electric conductivity of the support-side of the irradiated layer is much lower than that of the irradiated surface, therefore, the difference of electric conductivity between irradiated and non-irradiated surfaces can be utilized for various kinds of uses.

The photosensitive materials of the present invention may be used for the off-set printing, because the irradiated surface consisted of metallic silver is hydrophobic or lipophilic. Further, they may be used to make flexible mirrors having flexible supports, decorative articles having beautiful metallic lustre, printings for advertisement and other various articles.

Depending upon the each application described above, physical or chemical post-treatment may be carried in order to modify the physical or chemical properties of the layer or the surface of the photosensitive materials of this invention, for example, heating, electrolytic polishing, electrodeposition, physical development, mechanical polishing, burying into insulator, coating with insulator, joining with solder, coloring and so forth.

The following examples illustrate the embodiment of the present invention, but are not intended to be construed as limiting the scope of the present invention.

*Example 1*

The layer of silver alginate of about 10$\mu$ thickness was prepared by coating 0.5 cc. of 2% aqueous sodium alginate solution on the glass plate having area of 10 cm.$^2$ to form a layer on it, drying and then immersing the glass plate in 0.05-normal aqueous silver nitrate solution for thirty minutes or pouring a few milliliters of the solution on the layer of sodium alginate.

After drying, said layer was exposed to the high voltage mercury lamp (Model HL–400 P, manufactured by Tokyo Shibaura Denki Co., Ltd.) of 400 watt at a distance of 1 cm. for an hour.

Silver was deposited on the surface of the film by the irradiation, and the color of the surface of the layer changed through dark brown to metallic lustre.

The silver layer of below about 10$\mu$ thickness obtained on the side irradiated with ultraviolet ray had electric resistance of about 10$\Omega$ per 0.5 cm. x 1 cm., while the opposite side had no electric conductivity.

Further, electric conductivity was not observed between the side irradiated with ultraviolet ray and the opposite side. Resistance value described above, is measured with the layer of below 10μ thickness, therefore the specific resistance value becomes much lower than said value. The electric resistance of silver alginate is the order of $10^{10}\Omega$. Thus the electric conductivity of photosensitive material of this example was increased to $10^9$ times with irradiation.

*Example 2*

The procedure of Example 1 was repeated to prepare the photosensitive material except that Bakelite was used instead of glass as a support.

Microelectric circuits were produced with irradiation through an original figure drawed on a quartz plate.

*Example 3*

Polyethyleneterephthalate film of 15 x 30 cm. previously subbed with gelatin was coated with 4% aqueous potassium alginate solution and dried to form a layer of 15μ thickness on it. After contacting the layer with 0.5% aqueous silver acetate solution and drying it slowly, the film still in wet-state was placed underneath five sterilizing lamps (Model GL–15, manufactured by Tokyo Shibaura Denki Co., Ltd.) at a distance of 5 cm. and irradiated for an hour. Thus a flexible mirror was obtained.

What we claim is:

1. A process for producing an electrically conductive pattern, comprising the steps of coating a support with an aqueous solution of salts of alginic acid to form a layer thereon, treating said layer with an aqueous silver salt solution to form a layer of silver alginate, and exposing said layer of silver alginate to ultra-violet radiation for a sufficient period of time to form an electrically conductive metallic surface having a predetermined pattern.

2. A process for producing an electrically conductive pattern, comprising the steps of coating a support with an aqueous solution of an alginate selected from the group consisting of an alkali metal alginate and ammonium alginate to form a layer of said alginate, treating said layer with an aqueous solution of a silver salt selected from the group consisting of silver nitrate, silver chlorate, silver perchlorate, silver acetate, and silver lactate to form a layer of silver alginate, and exposing said layer of silver alginate to ultraviolet rediation for a sufficient period of time to form an electrically conductive metallic surface having a predetermined pattern.

References Cited by the Examiner

UNITED STATES PATENTS

| | | | |
|---|---|---|---|
| 1,976,302 | 10/1934 | Sheppard et al. | 96—94 |
| 2,366,439 | 1/1945 | Chilton et al. | 96—83 |
| 2,835,576 | 5/1958 | Ensink | 96—94 |
| 3,048,469 | 8/1962 | Brown | 260—430 |

FOREIGN PATENTS

| | | |
|---|---|---|
| 756,710 | 9/1956 | Great Britain. |

OTHER REFERENCES

Jaffe: "Halftone Photography for Offset Lithography," pages 25–27, Lithographic Technical Foundation, Inc., 131 E. 39th St., New York 16, New York (1960).

Remy: "Treatise on Inorganic Chemistry," vol. II, page 394, Elsevier Publishing Co., New York (1956).

NORMAN G. TORCHIN, *Primary Examiner.*